United States Patent
Belforte et al.

(10) Patent No.: US 10,315,345 B2
(45) Date of Patent: Jun. 11, 2019

(54) METHOD OF MANUFACTURE OF A COMPONENT FOR A MOTOR-VEHICLE INTERIOR

(71) Applicant: C.R.F. Società Consortile per Azioni, Orbassano (Turin) (IT)

(72) Inventors: Luca Belforte, Turin (IT); Nello Li Pira, Fossano (IT)

(73) Assignee: C.R.F. SOCIETA CONSORTILE PER AZIONI, Orbassano (Turin) (IT)

( * ) Notice: Subject to any disclaimer, the term of this patent is extended or adjusted under 35 U.S.C. 154(b) by 307 days.

(21) Appl. No.: 15/210,549

(22) Filed: Jul. 14, 2016

(65) Prior Publication Data

US 2017/0028602 A1 Feb. 2, 2017

(30) Foreign Application Priority Data

Jul. 31, 2015 (EP) .................................... 15179375

(51) Int. Cl.
  *B29C 45/14* (2006.01)
  *B60R 13/02* (2006.01)
  *B29K 669/00* (2006.01)
  *B29L 31/30* (2006.01)

(52) U.S. Cl.
  CPC .. *B29C 45/14344* (2013.01); *B29C 45/14647* (2013.01); *B60R 13/0256* (2013.01); *B29C 2045/14967* (2013.01); *B29K 2669/00* (2013.01); *B29K 2995/0025* (2013.01); *B29K 2995/0026* (2013.01); *B29L 2031/30* (2013.01); *B60R 2013/0287* (2013.01)

(58) Field of Classification Search
  CPC .................... B29C 45/14344; B29C 45/14647
  See application file for complete search history.

(56) References Cited

U.S. PATENT DOCUMENTS

| | | |
|---|---|---|
| 2005/0002168 A1 | 1/2005 | Narhi et al. |
| 2009/0108985 A1 | 4/2009 | Haag et al. |
| 2012/0314348 A1 | 12/2012 | Moncrieff |

FOREIGN PATENT DOCUMENTS

| | | |
|---|---|---|
| DE | 10 2011 013 372 A1 | 9/2012 |
| WO | 2011/020946 A2 | 2/2011 |
| WO | 2013/058708 A1 | 4/2013 |
| WO | 2015/044523 A1 | 4/2015 |

OTHER PUBLICATIONS

European Search Report dated Oct. 29, 2015, completed on Oct. 23, 2015, for corresponding EP Application No. 15179375.9.

*Primary Examiner* — Timothy Kennedy
(74) *Attorney, Agent, or Firm* — Heslin Rothenberg Farley & Mesiti P.C.; Victor A. Cardona, Esq.

(57) ABSTRACT

A method for the manufacture of a component for a motor-vehicle interior with an associated film in which an electronic circuit is integrated with at least one proximity sensor includes the step of thermoforming the film on a mold element and the step of injection of plastic material in a mold cavity in such a way as to obtain a component for interior of motor-vehicle comprising a body of substantially transparent plastic material associated to the film. The component includes one or more proximity sensors for activating a functional component of the motor-vehicle.

5 Claims, 5 Drawing Sheets

*FIG. 4*
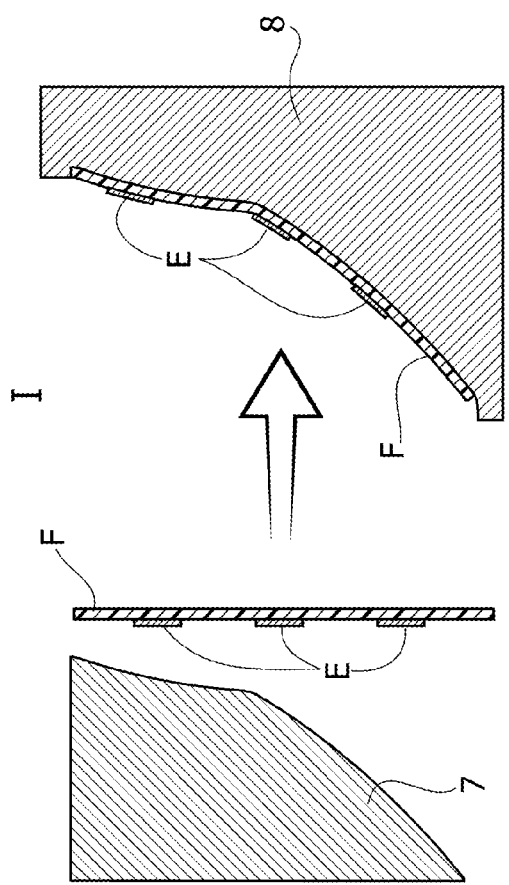
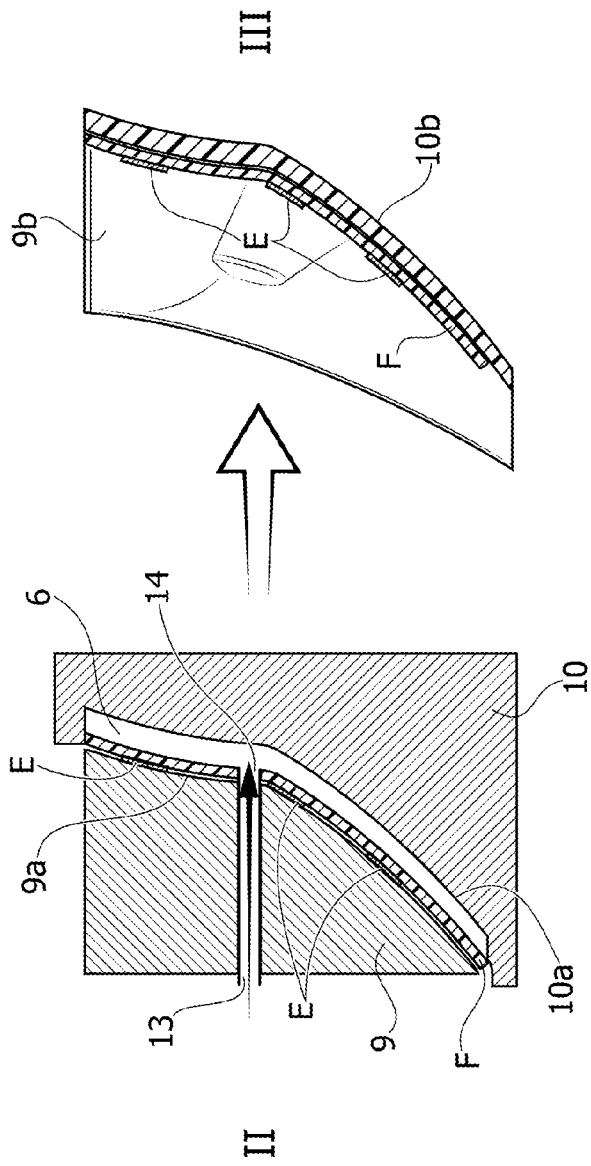

METHOD OF MANUFACTURE OF A COMPONENT FOR A MOTOR-VEHICLE INTERIOR

CROSS REFERENCE TO RELATED APPLICATIONS

This application claims priority from European patent application No. 15179375.9 filed on Jul. 31, 2015, the entire disclosure of which is incorporated herein by reference.

FIELD OF THE INVENTION

The present invention relates to methods for the manufacture of components for a motor vehicle interior, and in particular relates to a method for producing in efficient way a component for a motor-vehicle interior to which there is associated a film of plastic material with an integrated electronic circuit including one or more proximity sensors, which can be activated with a touch by the user to control one or more functional components of the motor-vehicle.

OBJECT OF THE INVENTION

The object of the present invention is to propose a method for obtaining a component of the above indicated type which is functional and at the same time aesthetically appealing.

A further object of the invention is to propose a method which is simple and inexpensive and whilst not compromising the quality of the final produced component.

The method presents also the advantage of creating a very compact component, with reduced weight and size.

SUMMARY OF THE INVENTION

In order to achieve the above mentioned object, the invention is directed to a method for the manufacture of a component for a motor-vehicle interior with an associated flexible film of plastic material in which an electronic circuit is integrated, said electronic circuit including one or more proximity sensors and one or more LED light sources, said method of manufacture being characterized in that it comprises the following steps:

providing said flexible film of plastic material with said integrated electronic circuit, thermoforming said film on a mold element having a profile surface corresponding to a back surface of the motor-vehicle interior component to which said film is intended to be associated, arranging said thermoformed film within a cavity of a mold to form said component by injection of plastic material, said mold cavity being defined between a first and a second main surfaces facing each other and respectively intended to define a back surface and a front surface of the component, said film being arranged on said first main surface of the mold cavity, forming said component by injecting plastic material into said cavity through at least one injection duct opening out on said mold cavity at said first surface of the mold cavity, said film having at least one opening at said injection duct, for the passage of the plastic material injected into the mold cavity, and removing the formed component with the film associated therewith, said film defining the back surface of the component.

According to a further characteristic of the invention the step of injection of plastic material is performed with a material which originates a body of substantially transparent plastic material.

In addition, the flexible film comprises at least one proximity sensor for the activation of a functional component of the motor-vehicle by a user inside the motor-vehicle.

Thanks to the above mentioned characteristics, the component for motor-vehicle interior can be obtained in a simple and inexpensive way and at the same time it is extremely functional and appealing to the eye of the user of the motor-vehicle.

BRIEF DESCRIPTION OF THE DRAWINGS

Further features and advantages of the invention will become apparent from the following description with reference to the annexed figures, given purely by way of non-limiting example, in which:

FIG. 4 shows the steps of the method according to the present invention, for production of the component of FIG. 2, FIGS. 5, 6 show two diagrammatic cross-sectional views of a detail of the component for motor-vehicle interior in two different embodiments according to the invention.

DETAILED DESCRIPTION OF A PREFERRED EMBODIMENT

The example shown in FIGS. 1-6 refers to the case in which the component obtained with the method of the present invention is a door of a storage compartment which is part of the dashboard of a motor-vehicle. As will be illustrated more in detail in the following, in this embodiment the user interacts with the proximity sensor of the flexible film associated to the door of the storage compartment in order to activate the lock of the door and then to open the door itself. However, it is evident that the method of the present invention is applicable to the production of any other type of component for motor-vehicle interior such as a panel of the dashboard, or an armrest, or a central console, including one or more proximity sensors for activation of corresponding functional components of the motor-vehicle.

Figure 1:
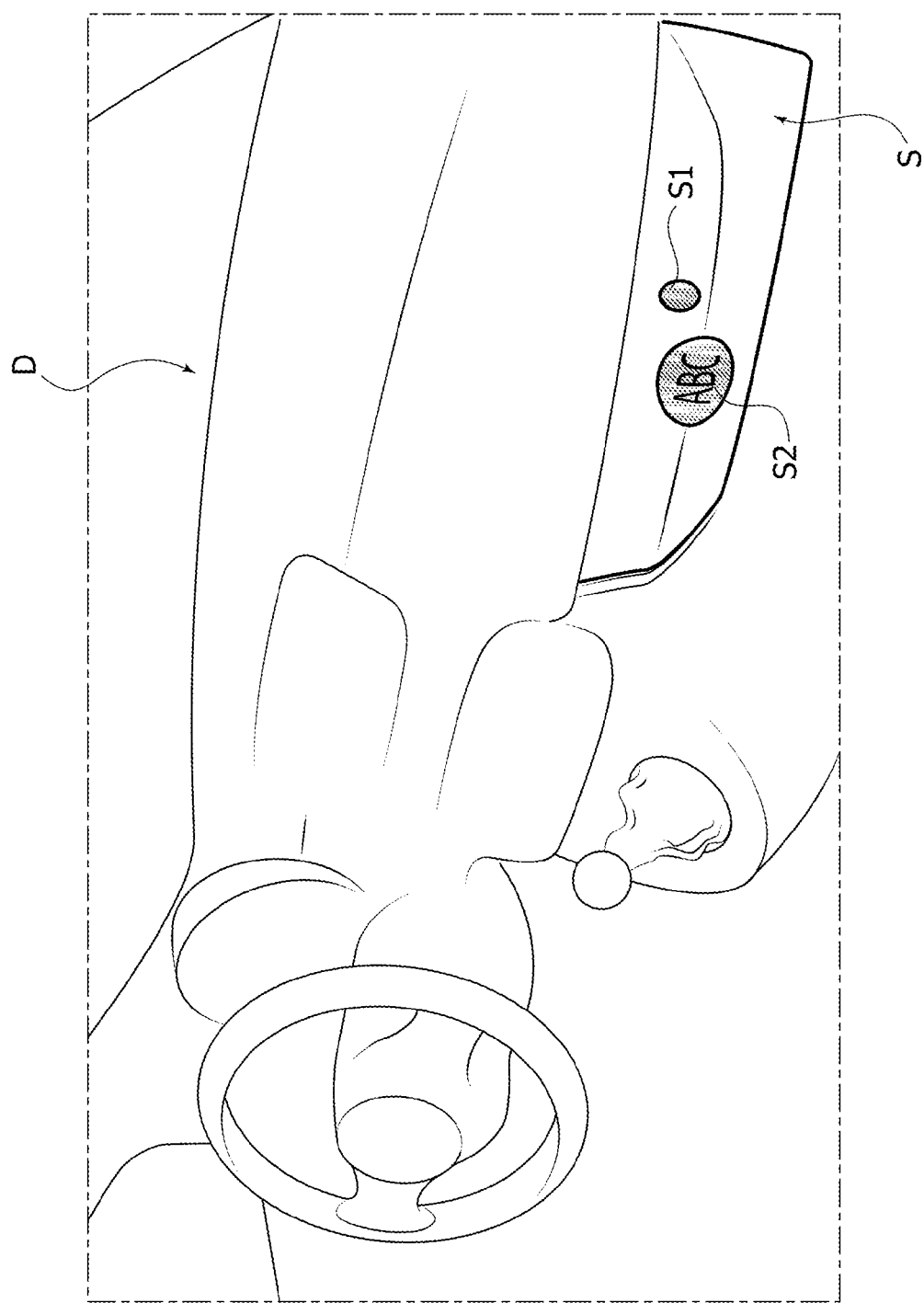
FIG. 1 is a diagrammatic perspective view of a motor-vehicle dashboard.

With reference to FIG. 1, reference D generally indicates a dashboard of a motor-vehicle. Reference S designates a door of a storage compartment which is part of the dashboard D. The door S is manufactured according to the method of the present invention.

Figure 2:
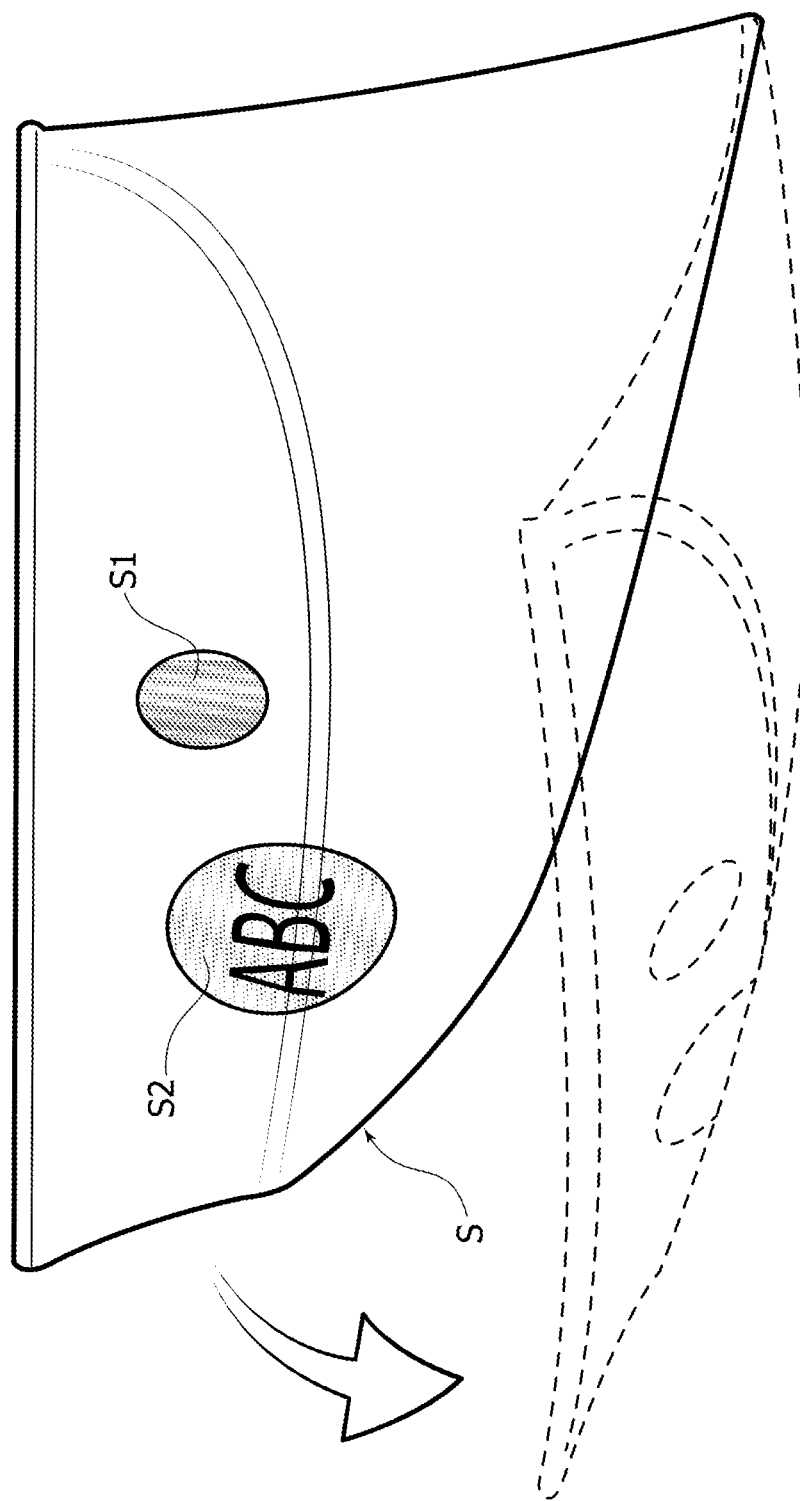
FIG. 2 is a perspective view of a preferred embodiment of the component for a motor-vehicle interior obtained with the method according to the invention.

As shown in FIG. 2, the door S of the storage compartment presents a decorative element, such as a logo, S2 and a proximity sensor S1. The proximity sensor S1 can be activated by a user with a touch on the sensor itself in order to activate the lock of the door S and then open the door S as illustrated by dotted lines in FIG. 2.

In a preferred embodiment, the proximity sensor S1 is located at the decorative element, such as a logo, S2.

Figure 3:
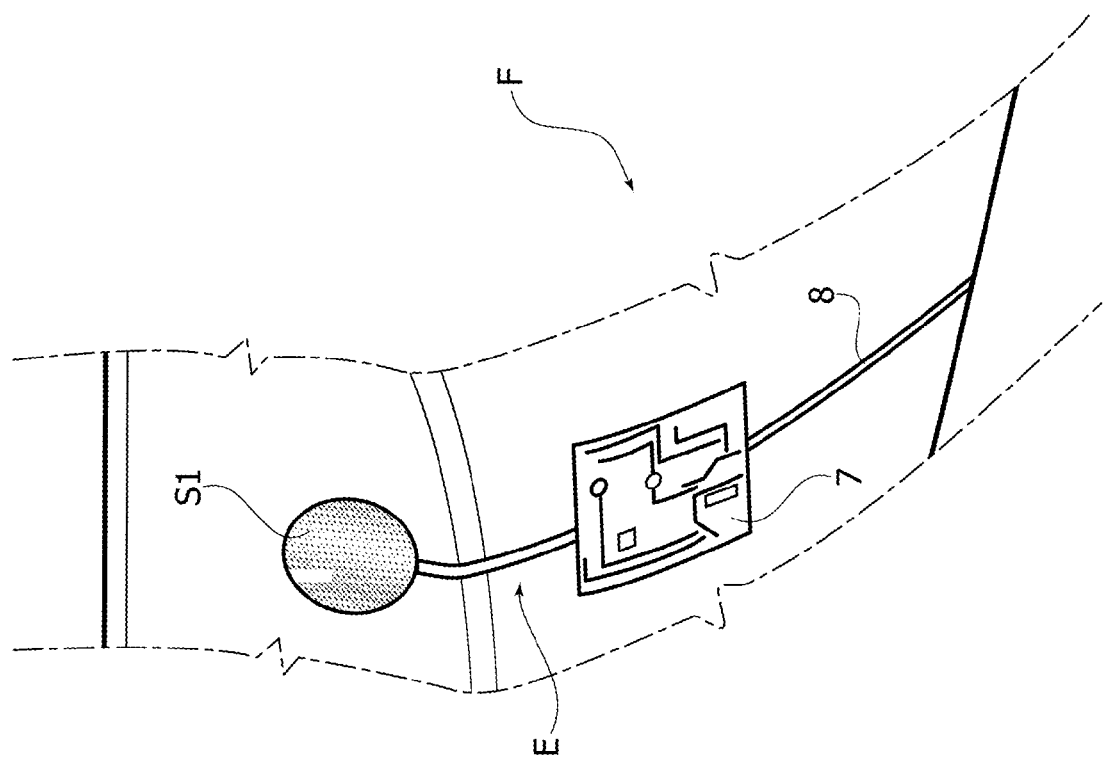
FIG. 3 is a perspective view of the flexible film associated to the component of FIG. 2.

To the door S, as previously indicated, there is associated a film F of plastic material which is illustrated in FIG. 3. The film F presents characteristics of high flexibility and has an electronic circuit E integrated inside thereof. The electronic circuit E, which is diagrammatically shown again in FIG. 3, presents an electronic board 7 and a number of connecting wires 8 which connect the proximity sensor S1 to the electronic board E.

The electronic circuit E and the electronic board 7 are arranged in such a way that they also have a certain degree of flexibility, in order to avoid a stiffening effect on film F.

The details relating to the electronic circuit and the proximity sensors, as well as the way to integrate them within the film F, are not illustrated herein, since they can be obtained in any known way, and also because such details, taken alone, are not within the scope of the present invention. Furthermore, the elimination of these details from the drawings renders the latter more readily and easily understandable.

In FIG. 4 there are illustrated subsequent steps I, II, III of the method according to the present invention for the manufacture of the door S to which the film F is associated.

Step I is a thermoforming step which is carried out with two mold elements 7, 8. The thermoforming step consists in arranging the film F on the main surface of the mold element 8 and applying a pressure on the film F on the main surface of the mold element 8 by means of the mold element 7. The mold element 7 is a negative reproduction of the main surface of the mold element 8. The thermoforming step takes place after bringing the film F at a temperature at least equal to the softening temperature of the plastic material of which it is constituted, in such a way that the film F takes the shape of the main surface of the mold element 8.

The thermoforming step can also be carried out by means of a "high pressure forming", which involves the use of pressurized air in place of the mold element 7. This technology is preferable because it results in lower stresses being applied to the film F.

The next step of the method is a step II for forming the door S with the associated film F. This step involves the injection of plastic material into a mold cavity 6 defined by two mold elements 9, 10. Before the injection of plastic material, the film F which has been thermoformed in step I is arranged within the cavity 6 of the mold. Such cavity 6 has two main surfaces 9a, 10a, facing each other and respectively intended to define a back surface 9b and a front surface 10b of the door S (see FIGS. 4-III).

The thermoformed film F is arranged into the cavity 6, resting on the surface 9a of the mold element 9.

In order to obtain the body of the door S, the plastic material is injected into the cavity 6 through an injection duct 13 obtained through the mold element 9 and opening out on the surface 9a of such element. The film F is arranged with at least one opening 14 at the outlet of the injection duct 13, in order to allow the passage of the plastic material into the cavity 6.

In this way, after the injection molding, a component is obtained, specifically a door S of storage compartment, which has the film F associated to its back surface 9b. Such characteristic represents an advantage, since in this way any defects of the surface of the molded piece at the injection duct 13 are hidden from view.

The injected plastic material is chosen so that the finally obtained component is a substantially transparent body 12, in such a way that the sensor S1 is visible.

In an alternative embodiment, before the injection of the plastic material, a decorative plastic film 15 is applied on the film F so that in the final door S, the decorative film 15 is located between the film F and the body 12 of the door S.

The decorative plastic film 15 can also be inserted into the mold cavity 6 on the surface 10a. In such case the injection is carried out between the film F and the decorative plastic film 15 and the door S can be removed from the mold cavity 6 in an already completed state.

Again in FIG. 4, the step III consists in removing the door S from the mold cavity 6, once the forming step II is concluded. FIG. 4-III shows the finally obtained component, after removal from the mold.

Figure 5:
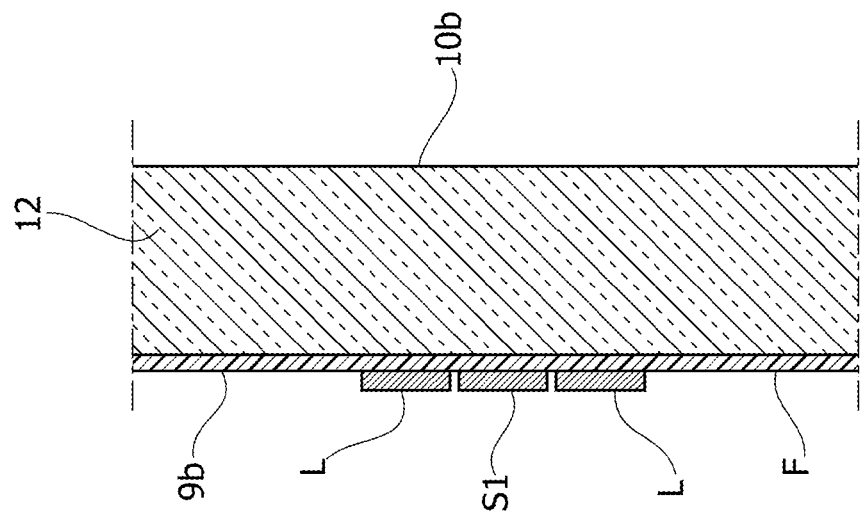

In FIG. 5 there is illustrated in cross-section a portion of the door S obtained with the previously described method of manufacture. The door S is therefore constituted by a plastic material body 12 with the film F associated therewith which defines the back surface 9b of the door S, while the front surface 10b remains exposed towards the user. The user is able to activate the lock of the door S (not illustrated herein) by means of a touch or of a pressure on the surface 10b in proximity of the sensor S1 of the film F, in order to open the door S. Again with reference to FIG. 5, the proximity sensor S1 is illuminated by two LED lights L adjacent to the sensor S1 so that the sensor S1 is visible even in poor light conditions.

Figure 6:
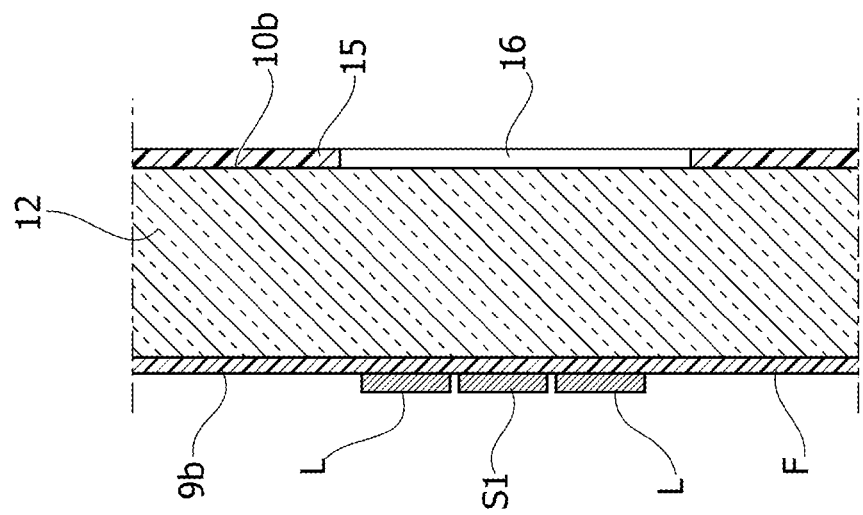

According to FIG. 6, which shows a preferred embodiment, on the front surface 10b of the door S there is applied a decorative plastic film 15. The decorative film 15, is obtained from a transparent film (e.g. made of polycarbonate) on whose backside there is molded a decoration by means of inks. The areas in which ink is not present remain transparent. The decorative film has the function to protect the plastic material 12 of the door S from any scratches and comprises one or more areas 16 to which the sensor S1 and/or the decorative element in form of logo S2 are visible (not illustrated in this figure).

The areas 16 also allow light from LEDs L to pass and to provide back-lighting for example to the logo S2.

Thanks to the above mentioned characteristics, the door S obtained with the method according to the present invention combines advantages of functionality and perception of a high aesthetic quality by the user. At the same time due to the above mentioned characteristics the method results to be simple and inexpensive, without jeopardizing the final quality of the product.

As already indicated, the herein illustrated application of the method of the invention to the production of a door for a storage compartment is provided purely by way of non-limiting example. The same method could be applied in order to manufacture other components, such as panels of the dashboard, or the central console or the armrest in the interior of a motor-vehicle. Such components can be provided with an electronic film of the type described herein, in such a way as to integrate proximity sensors, logos, LED sources, having similar functions to those described herein.

Naturally, while the principle of the invention remains the same, the details of construction and the embodiments may widely vary with respect to what has been described and shown purely by way of example, without departing from the scope of the present invention.

What is claimed is:

1. Method for the manufacture of a component for a motor vehicle interior with an associated flexible film of plastic material in which an electronic circuit is integrated including one or more proximity sensors and one or more LED light sources, said method comprising the following steps:
- providing said flexible film of plastic material with said integrated electronic circuit comprising said one or more proximity sensors and said one or more LED light sources,
- arranging said flexible film within a cavity of a mold to form said component by injection of plastic material, said mold cavity being defined between a first main surface and a second main surface facing each other and respectively intended to define a back surface and a front surface of a door of the motor vehicle interior,
- said flexible film being arranged on said first main surface of the mold cavity defining a back surface of the door,
- forming said door by injecting plastic material through an opening in said flexible film into said cavity through at least one injection duct opening out on said mold cavity at said first surface of the mold cavity, and
- removing the formed door with the flexible film associated therewith, said film defining the back surface of the door,
- wherein the step of injection of plastic material is performed with a material which originates a body of substantially transparent plastic material, and Prior to being arranged within said mold cavity, thermoforming said flexible film is
- on a mold element having a profile surface corresponding to a back surface of the motor-vehicle interior door to which said flexible film is intended to be associated, and
- before the injection of plastic material, applying a decorative film over said flexible film, with said electronic circuit, resting on said first surface of the mold cavity, such that, in the finally obtained door, said decorative film is interposed between the flexible film with said electronic circuit and the body of plastic material of the component.

2. Method for the manufacture of a motor-vehicle interior component according to claim 1, wherein the decorative film is substantially opaque to light and comprises one or more openings and/or transparent areas for the transmission of light radiation emitted by said LED light sources.

3. Method according to claim 1, wherein the front surface of the component comprises at least one surface portion through which a decorative element is visible, and further comprising illuminating the decorative element by said one or more LED sources.

4. Method for the manufacture of a motor-vehicle interior component according to claim 1, wherein a said at least one proximity sensor is configured to activate a functional component of a motor-vehicle in response to a user contacting said front of said door near said at least one proximity sensor.

5. Method according to claim 1, wherein said door is a door for a storage compartment on the dashboard of the motor-vehicle, and said at least one proximity sensor is configured to actuate a lock of said door in response to a user contacting said front of said door near said at least one proximity sensor.

* * * * *